United States Patent
Lee et al.

(10) Patent No.: US 6,937,326 B2
(45) Date of Patent: Aug. 30, 2005

(54) SCATTERING MONITOR IN OPTICAL FIBER DRAWING SYSTEMS

(75) Inventors: Dong-Hi Lee, Kumi-shi (KR); Yeong-Seop Lee, Kumi-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 16 days.

(21) Appl. No.: 10/620,135

(22) Filed: Jul. 15, 2003

(65) Prior Publication Data

US 2004/0017558 A1 Jan. 29, 2004

(30) Foreign Application Priority Data

Jul. 29, 2002 (KR) ................................ 10-2002-0044758

(51) Int. Cl.[7] ............................................. G01N 21/00
(52) U.S. Cl. ...................................................... 356/73.1
(58) Field of Search ........................... 356/73.1; 65/382, 65/378, 160, 29.18; 250/461.1, 302, 559.24, 559.28; 385/12–15, 31, 33, 39, 123

(56) References Cited

U.S. PATENT DOCUMENTS 6,025,906 A * 2/2000 Hepburn et al. ........... 356/73.1
6,424,409 B1 * 7/2002 Bighouse et al. .......... 356/73.1

* cited by examiner

*Primary Examiner*—Tu T. Nguyen
(74) *Attorney, Agent, or Firm*—Cha & Reiter, L.L.C.

(57) ABSTRACT

Disclosed is a monitoring system and method of monitoring optical-fiber drawing systems. The scattering monitor includes: a scattering monitor housing provided on a path drawing an optical fiber and having holes aligned on the upper and lower ends of the scattering monitor housing with the optical fiber passing there-through; a reflecting plate surrounding the optical fiber in the scattering monitor housing; a light condenser for converging light reflected from the reflecting plate; and, a light detector for detecting converged light and generating a corresponding electrical signal.

11 Claims, 3 Drawing Sheets

SCATTERING MONITOR IN OPTICAL FIBER DRAWING SYSTEMS

CLAIM OF PRIORITY

This application claims priority to an application entitled "Scattering Monitor In Optical Fiber Drawing Systems," filed in the Korean Intellectual Property Office on Jul. 29, 2002 and assigned Serial No. 2002-44758, the contents of which are hereby incorporated by reference.

BACKGROUND OF THE INVENTION

1. Field of the Invention

The present invention generally relates to an optical fiber. In particular, the present invention relates to an optical-fiber drawing system for drawing an optical fiber from an optical fiber pre-form.

2. Description of the Related Art

In a typical optical-fiber drawing process, an optical fiber pre-form is softened to its melting point and then pulled or drawn into a thin bare optical fiber. This bare optical fiber (also referred to as "bare glass") is hot enough to be sensitive to external contaminants before it is coated. Therefore, the bare optical fiber must be protected from contaminants such as atmospheric dust. To this end, gas or air is blown towards the bare optical fiber. Further, the bare optical fiber is cooled by passing it through a cooling apparatus. The cooled bare optical fiber is then coated.

FIG. 1 illustrates a side view of an optical-fiber drawing system according to the conventional art. In FIG. 1, a furnace 120, a cooler 140, a coating applicator 150, an ultra-violet (UV) curer 170 and a capstan 180 are shown.

The furnace 120 is hot enough to maintain a temperature of at least 2,000° C. thus softening the end of an optical pre-form in order to generate a bare optical fiber 130 from the softened pre-form.

The cooler 140 cools the optical fiber to a temperature suitable for coating the bare optical fiber 130 and includes a cooling tube for cooling gas, i.e., helium, through which to flow. Further, a coolant such as cooling water, liquid nitrogen, or the like is circulated through a spacing between the inner and outer walls of the cooling tube so as to insulate the cooler 140.

The coating applicator 150 is provided with a path filled with atmospheric gas, through which the bare optical fiber passes. The coating applicator 150 has a retainer in which liquid coating material fed from its storage tank (not shown) is contained. The bare optical fiber is coated in the course of passing through the retainer. The coating material, like various types of UV curable resin, is curable under UV radiation. Alternatively, a thermosetting resin may be used as the coating material.

The UV curer 170 cures the coating material coated on a circumference of the bare optical fiber, i.e., the UV curable resin under UV radiation.

The capstan 180 pulls the cured bare optical fiber 160 under a predetermined force so that the cured bare optical fiber can be drawn continuously at a constant diameter.

The optical fiber 160 has a very small diameter of 125±0.2 $\mu$m. Consequently, when the drawn optical fiber has a non-uniform profile resulting from accidental scratching, a microstructure defect of the optical fiber pre-form, unstable coating pressure, etc., during drawing at a high speed, a scattering phenomenon may be created in the optical fiber. If this scattering phenomenon becomes large enough for detection during a megascopic check, most operators may be able to cope with it. In fact, it is difficult to observe a minute scattering phenomenon without the aid of any tool, which acts as a factor of quality failures. In addition, as this scattering phenomenon is dependent on an observing angle, it is difficult to measure precisely.

SUMMARY OF THE INVENTION

Accordingly, the present invention is to provide a scattering monitor in optical-fiber drawing systems, in which quality improvement as well as productivity improvement can be promoted, by monitoring a scattering phenomenon resulting from a non-uniform profile of the optical fiber during an optical-fiber drawing process.

In one embodiment of the present invention, there is provided a monitoring system for an optical-fiber drawing system, including: a scattering monitor housing provided on a path drawing the optical fiber defining holes aligned on the upper and lower ends of the scattering monitor housing; a reflecting plate surrounding the optical fiber in the housing; a light condenser for converging light reflected from the reflecting plate; and, a light detector for detecting converged light and generating a corresponding electrical signal.

Preferably, the embodiment provides a controller for measuring the power of the electrical signal and comparing it to a predetermined reference value, that when exceeded, warns an operator of an abnormality.

DETAILED DESCRIPTION OF THE PREFERRED EMBODIMENT

Figure 1:
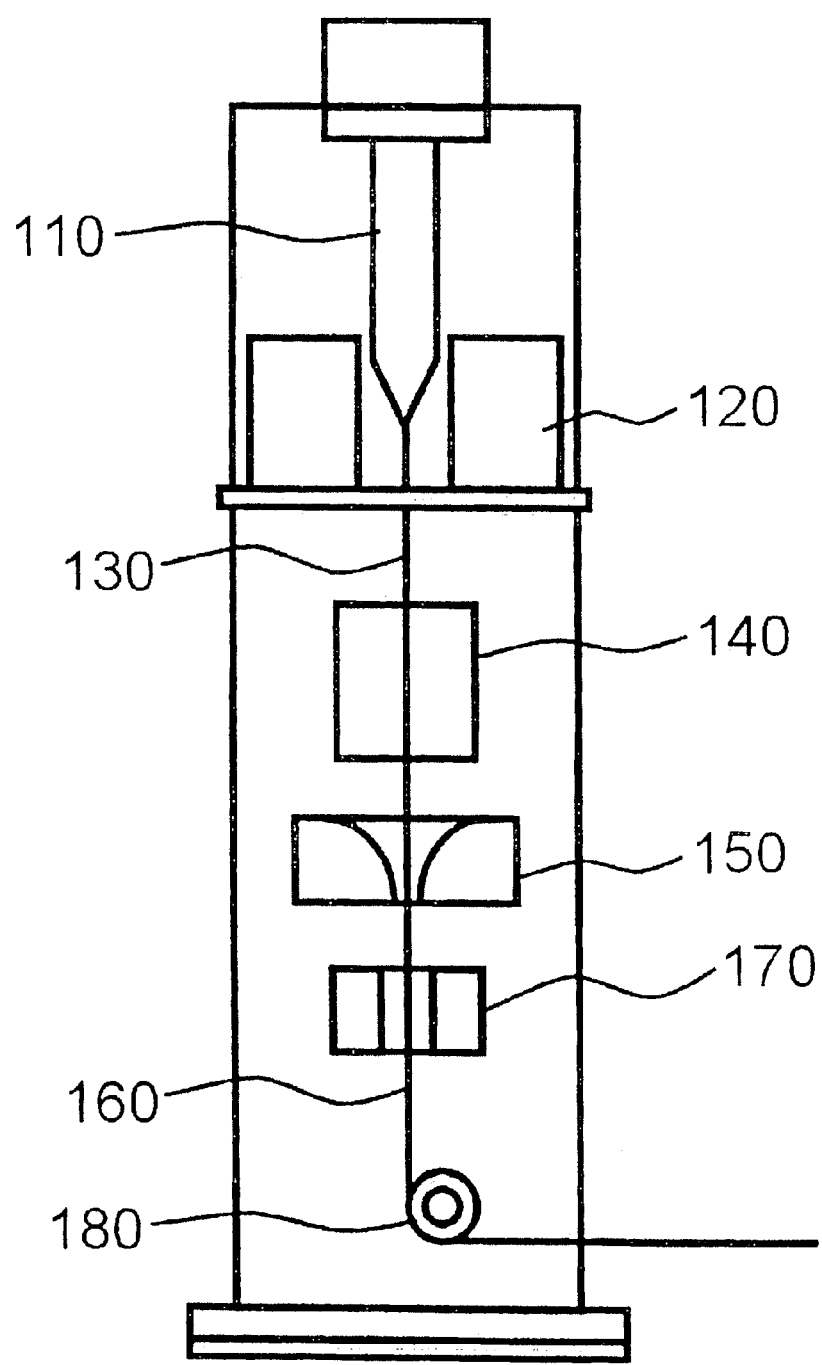
FIG. 1 is a side view of an optical-fiber drawing system according to the conventional art.

In accordance with the present invention, preferred embodiments of the present invention will be described in detail with reference to the accompanying drawings. In the drawings, the same element, although depicted in different drawings, will be designated by the same reference numeral or character. For the purposes of clarity and simplicity, a detailed description of known functions and configurations incorporated herein will be omitted as it may make the subject matter of the present invention unclear.

Figure 2:
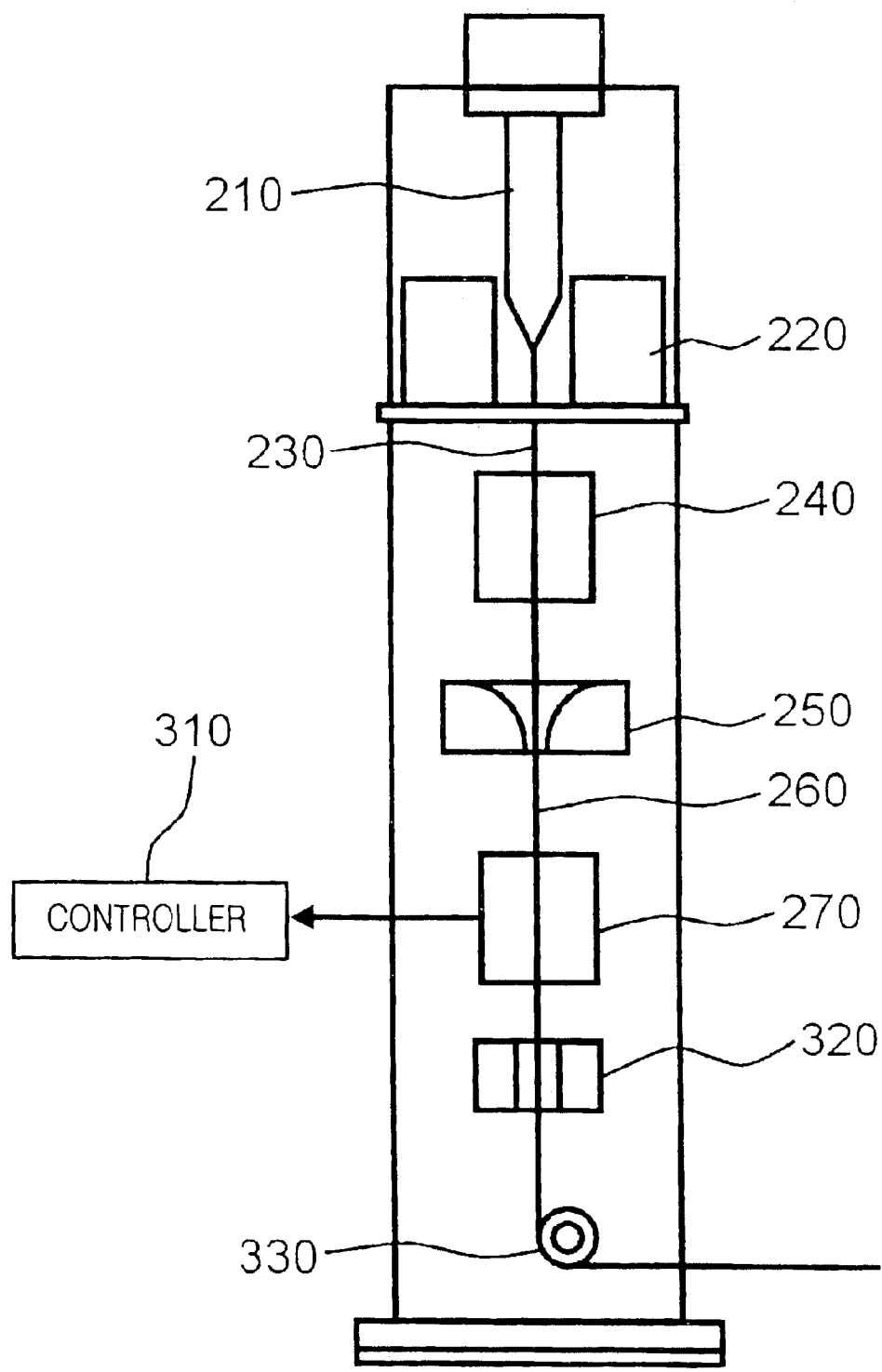
FIG. 2 is a side view of an optical-fiber drawing system according to a preferred embodiment of the present invention.
Figure 3:
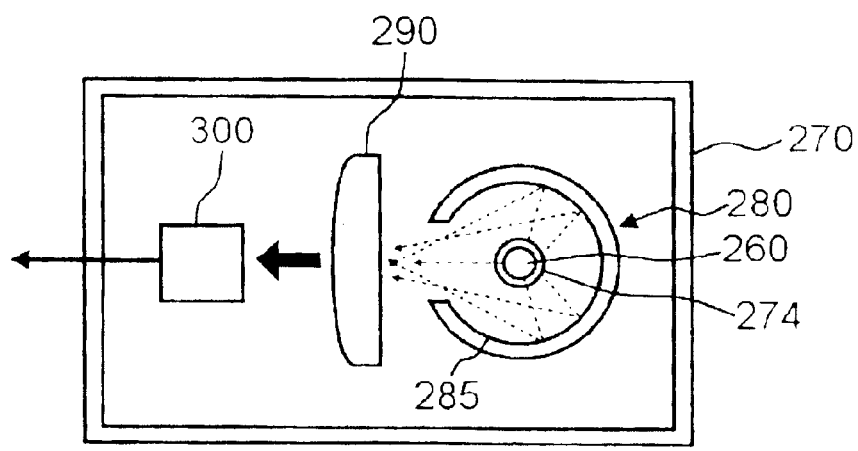
FIG. 3 is a schematic plan view of a scattering monitor of the optical-fiber drawing system; and, FIG. 4 is a schematic front view of a scattering monitor of the optical-fiber drawing system.
Figure 4:
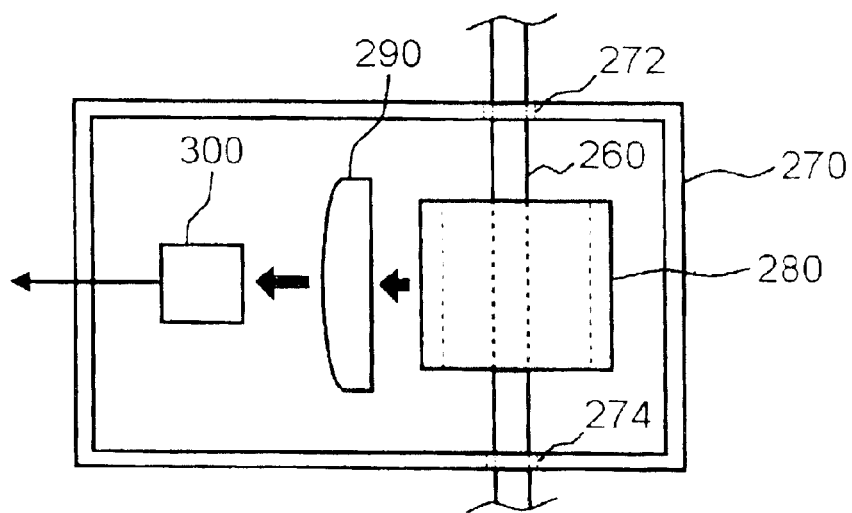

FIG. 2 is a side view of an optical-fiber drawing system according to a preferred embodiment of the present invention. FIG. 3 is a schematic plan view of a scattering monitor of the optical-fiber drawing system. FIG. 4 is a schematic front view of a scattering monitor of the optical-fiber drawing system.

As shown, the optical-fiber drawing system comprises a furnace 220, a cooler 240, a coating applicator 250, a scattering monitor 270, an ultra-violet (UV) curer 320, a capstan 330 and a controller 310.

The furnace 220 maintains a temperature of at least 2,000° C. and softens the end of an optical pre-form. The softened pre-form is generated into a bare optical fiber 230.

The cooler 240 cools the bare optical fiber 230 to a temperature suitable for coating. The cooler 240 includes a cooling tube (not shown) for a cooling gas, like helium, through which to flow. Further, a coolant such as cooling water, liquid nitrogen, or the like is circulated through a spacing between the inner and outer walls of the cooling tube so as to insulate the cooler 240.

The coating applicator 250 is provided with a path filled with atmospheric gas, through which the bare optical fiber passes. The coating applicator 250 has a retainer in which liquid-coating material fed from its storage tank (not shown) is contained. The bare optical fiber 230 is coated in the course of passing through the retainer. This coating material, like various types of UV curable resin, is curable under UV radiation. Alternatively, thermosetting resin may be used for the coating material.

The scattering monitor 270 has a sealed housing which can communicate with its external elements through the upper and lower holes 272 and 274. The coated bare optical fiber 260 passes through the housing 270, specifically, from the upper hole 272 to the lower hole 274. The diameter of the upper and lower holes 272 and 274, respectively, are slightly larger than that of the optical fiber 260, thereby preventing external light from penetrating the housing through the upper and lower holes 272 and 274, respectively.

Referring to FIGS. 3 and 4, the scattering monitor housing 270 is mounted with a reflecting plate 280, a light condenser 290, and a light detector 300.

The reflecting plate 280 is provided with reflecting film on its inner surface. The reflecting plate 280 is provided as a hollow cylinder in the shape of the letter C. The open portion faces the light condenser. The reflecting plate 280 is installed to surround the optical fiber 260, enabling scattered light radiated from the circumferential surface of the optical fiber to be reflected through the opening.

The light condenser 290 converges scattered light reflected from the reflecting plate 280. The light condenser 290 consists of a convex lens, an aspherical lens, or a combination thereof.

The light detector 300 functions to detect the converged scattered light, and to transform it into an electrical signal that is outputted to the controller 310. The light detector 300 consists of a photodiode, a CCD camera, a CdS cell or the like.

The controller 310 measures scattering levels by the measure of the power of the electrical signal, and then determines a non-uniform profile of the optical fiber 260 on the basis of the measured results. In the controller 310, an acceptable reference power value is predetermined, and checked against the measured power value to see if it is greater than the reference power value. If the measured power value is greater than the reference power value, the controller 310 can function either to stop drawing the optical fiber or to alert the occurrence of an abnormal operation using a warning device (not shown). In addition, the controller 310 can display the power value of the electrical signal on a display monitor (not shown), so as to allow an operator to check the abnormal operation in real time.

The UV curer 320 provides UV radiation to the surface of the optical fiber to cure the coating material coated on the optical fiber. Additionally, UV rays incidental to the optical fiber are scattered out of the optical fiber due to a non-uniform profile of the optical fiber 260.

The capstan 330 pulls the optical fiber 260 with a given force so that the optical fiber can be continuously drawn from the optical fiber pre-form at a constant diameter.

As seen above, the scattering monitor in optical-fiber drawing systems according to the present invention has an advantage because it can promote quality improvement and productivity improvement by monitoring a scattering phenomenon resulting from a non-uniform profile of the optical fiber during the optical-fiber drawing process.

While the invention has been shown and described with reference to a preferred embodiment thereof, it will be understood by those skilled in the art that various changes in form and details may be made therein without departing from the spirit and scope of the invention as defined by the appended claims. Therefore, this invention is not to be limited unduly to the embodiment set forth herein, but it is to be defined by the appended claims and the equivalents thereof.

What is claimed is:

1. A monitoring system for drawing an optical fiber, comprising:

a scattering monitor housing provided on a path drawing and UV curable coating the optical fiber and having holes aligned on upper and lower ends of the scattering monitor housing with the optical fiber passing therethrough;

a reflecting plate having a hollow C shape surrounding the optical fiber in the scattering monitor housing for reflecting light scattered from the optical fiber;

a light condenser located outside the reflecting plate for converging the light reflected from the reflecting plate; and, a light detector for detecting the converged light and generating a corresponding electrical signal.

2. The monitoring system according to claim 1, further comprising a controller for measuring the power of the electrical signal and comparing it to a predetermined reference value.

3. The monitoring system according to claim 2, wherein the controller further includes means for determining a non-uniform profile of the optical fiber based upon the measured electrical signal.

4. The monitoring system according to claim 2, wherein the controller further comprises means for stopping the drawing process if the power of the electrical signal is substantially greater than the predetermined reference value.

5. The monitoring system according to claim 2, wherein the controller further comprises means for warning an operator if the power of the electrical signal is substantially greater than the predetermined reference value.

6. The monitoring system according to claim 1, wherein the light detector is a photodiode.

7. The monitoring system according to claim 1, wherein the light detector is a CCD camera.

8. The monitoring system according to claim 1, wherein the light detector is a CdS cell.

9. The monitoring system according to claim 1, wherein the light condenser includes a convex lens.

10. The monitoring system according to claim 1, wherein the light condenser includes an aspherical lens.

11. The monitoring system according to claim 1, wherein the light condenser includes a combination of convex and aspherical lenses.

* * * * *